April 3, 1951 B. B. BLACKFORD ET AL 2,546,964
SMOKE GENERATOR
Filed March 26, 1946 2 Sheets-Sheet 1
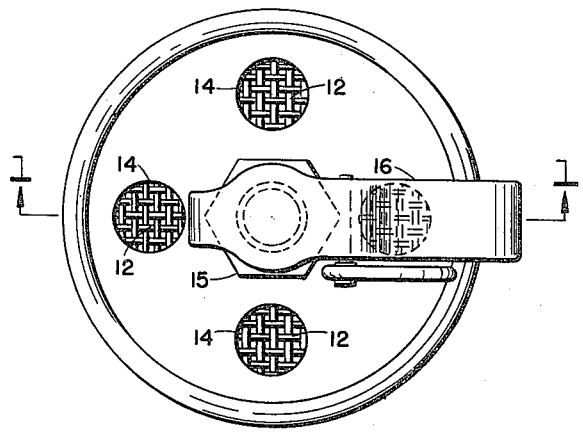
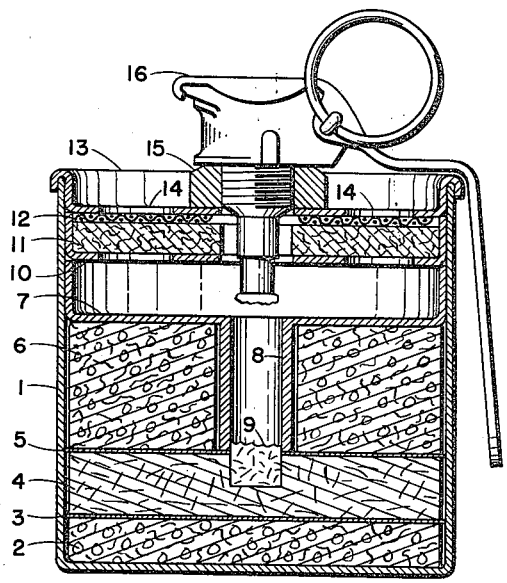
INVENTORS
CHARLES R. WALLACE
BENJAMIN B. BLACKFORD
BY
ATTORNEY April 3, 1951 B. B. BLACKFORD ET AL 2,546,964
SMOKE GENERATOR
Filed March 26. 1946 2 Sheets-Sheet 2

Inventors
CHARLES R. WALLACE
BENJAMIN B. BLACKFORD

By M. O. Hayes

Attorney

Patented Apr. 3, 1951

2,546,964

UNITED STATES PATENT OFFICE 2,546,964

SMOKE GENERATOR

Benjamin B. Blackford and Charles R. Wallace,
United States Navy

Application March 26, 1946, Serial No. 657,321

1 Claim. (Cl. 252—359)

(Granted under the act of March 3, 1883, as
amended April 30, 1928; 370 O. G. 757)

Our invention relates to a method and apparatus for dispersing volatile smoke-producing substances by flash boiling with a minimum of decomposition and at high heat transfer efficiency.

Prior to our invention smoke candles have effected a transfer of heat either by mixing a pyrotechnic fuel with a volatile substance, parts of which decomposed during the burning period, or by employing a complicated device wherein a stream of molten volatile material was projected into a stream of hot gases from a pyrotechnic mixture.

Accordingly, our invention has among its objects to provide a method of operation for a smoke-producing device which eliminates common difficulties, the method being to flash boil the material to be dispersed by causing it to melt and flow onto a rigid, glowing-hot body of fuel.

Another object of our invention is to provide a simple method and apparatus for the dispersal of various smokes from such volatile materials, as pressed dye cakes, paraffin wax-oil gels, and oil gels with a minimum of decomposition of the volatile smoke-producing materials.

Another object of our invention is to provide a method and apparatus for dispersing vaporizable, organic dyestuffs wherein the dyestuffs lie in close contact with a hotly burning fuel but are not substantially decomposed thereby.

Another object of our invention is to provide a method and apparatus for the dispersal of various smokes with a minimum of decomposition thereof, wherein the transfer of heat from fuel to volatile material is substantially instantaneous and volatilization is attained after only momentary contact between the volatile material and the fuel.

Another object of our invention is to provide a method and apparatus for the dispersal of aerosols and smokes from volatile substances with a minimum of decomposition thereof, wherein the volatile substance is employed in solid form.

Further and more specific objects of our invention will be apparent from a consideration of the following description when taken in conjunction with the drawings wherein devices representing basic embodiments of our invention are shown as follows:

Figure 1 is a longitudinal section of a device embodying our invention taken along line 1—1 of Figure 2;

Figure 2 is a top elevation of the device shown in Figure 1;

Figure 3:
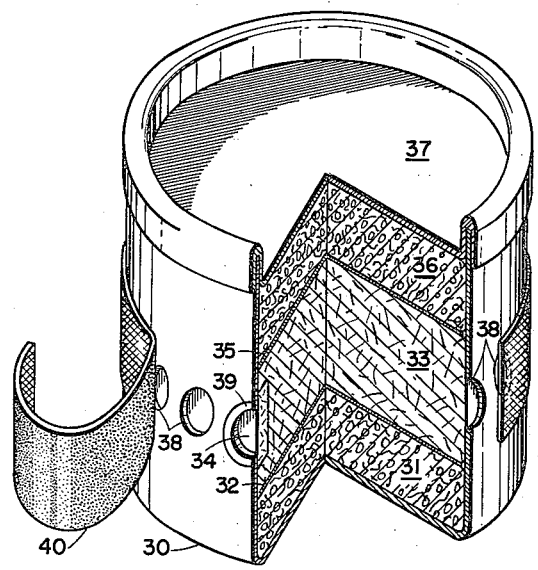
Figure 3 is a perspective view, partially in section, of a second embodiment of our invention.

Briefly, our invention contemplates the provision of a method and apparatus whereby volatile, organic, smoke-producing compounds may be dispersed with a minimum of decomposition, said method being to flash boil the material. The transformation of the solid dye stuffs or oil gels into vapors and the departure of these vapors from the combustion zone occurs so rapidly that no decomposition of the vapors takes place. Among the compositions readily dispersed are included oil gels, consisting of dispersions of metallic salts of fatty acids in high viscosity lubricating oils, solid mixtures containing paraffin wax or a micro-crystalline wax and oil, and various organic dye stuffs such as the azo type dyes "Oil Orange–Y293" and "Oil Yellow–7463" and the anthraquinone type dye "Oil Blue–NA" produced by the American Cyanamid Company.

Referring to Figure 1, the device shown comprises a cylindrical can 1 of sheet metal, for example 28 gage steel, having closed sides and bottom. In the bottom of the can 1 is placed a wafer or pressed cake 2 of the volatile smoke-producing compound, approximating 25 percent of the volatile material used per can, and over which is placed a thin sheet of metal foil 3, for example 0.001 inch aluminum foil. A pressed cake 4 of suitable composition is placed on the foil and is covered with a second sheet of foil 5, the second sheet having a circular hole through its center in order to expose a portion of the surface of the fuel cake. On the latter sheet of foil is placed a pressed cake 6 of the material to be volatilized, preferably doughnut-shaped, and comprising approximately 75 per cent of the smoke-producing material used per can. Above the smoke-producing compound is a baffle 7 comprising a flat-bottomed cup of sheet metal like that of the body of the can having a tube 8 which is silver-soldered to its bottom center, which tube projects downward through the central hole of the pressed volatile material 6 to the upper surface of the fuel cake 4. Near the bottom of the tube 8, a small pellet or ball 9 of loosely packed fuel is inserted to serve as a starting composition in the ignition of the main body of fuel 4. If desired, the pellet 9 may be imbedded in the top surface of the fuel cake 4. A filter unit rests on the top edges of the baffle 7 and consists of a sheet metal, flat-bottomed cup 10, having a central hole and a plurality of holes whose centers are located on the same circumference about the central axis and are placed at equal distances. A thin compressed plate or ring of glass wool 11 surmounted by a ring of 12-mesh wire screen 12 is contained in the cup.

A top closure for the device is provided in the form of a thin, steel flat-bottomed cup 13 having a central hole, and a plurality of ports 14 whose centers are located coaxially with those of the bottom cup 10 of the filter unit and whose diameters are the same as those of the bottom-cup 10. Over the central hole of the top closure is soldered a nut 15 into which a suitable igniting means such as a grenade fuse 16 is screwed. After the can 1 has been properly loaded with its elements and said elements and the top closure have been pressed in securely, the unit is hermetically sealed by rolling the top edges of can 1 over the top edges of top closure 13. To secure tight packing, we prefer to employ elements having diameters substantially equal to that of the main body 1 in order to secure a tight press-fit.

The device is operated by tripping the grenade starter 16 which projects a ball of flaming pyrotechnic mixture onto the pellet 9 of loose fuel. As this ball of fuel burns, it serves to ignite the main body of fuel 4 which preferably should be structurally strong and clean and even burning. The intense heat supplied by the combustion of the fuel melts the material 6 to be volatilized, allowing it to run down onto the glowing-hot body of fuel 4 where it immediately flash boils. The time of contact between fuel and volatile material is of such short duration that no substantial decomposition of the volatile material can occur. The vaporized dye or oil escapes up through the central tube 8 and out the ports 14 of the top closure 13. Any entrained droplets of volatile material are retained by the glass fiber filter 11 and the baffle arrangement 7 and are vaporized by the hot gases from the fuel. Ignition of the escaping vapors is prevented because the vapor velocity attained in escape through the orifices is greater than the flame propagation velocity through the vapors.

The portion 2 of volatile material placed beneath the main body of fuel serves to insulate the latter from the spot on which the can is resting. It is vaporized by the burning fuel cake and its vapors travel up through the ash and out the central tube.

The ash produced as the fuel burns should therefore be porous to allow free passage of vapors or gases from surface to surface within the fuel cake. It should have preferably a rigid, clinker-type structure and a high heat capacity in order to present the desirable hot surface suited to flash boiling.

The fuel itself should be structurally strong, should have a high heat capacity per unit volume and should be stable to heat, shock and in storage. A suitable fuel composition having these desirable properties and producing a rigid, porous clinker as preferred is a mixture such as iron-ammonium nitrate or iron-ammonium nitrate-sodium nitrate incorporated with suitable fillers as described in the copending application Serial Number 657,325 filed of even date herewith by Richard L. Tuve and Charles R. Wallace, now abandoned.

A suitable fuel is as follows:

| Component: | Parts by weight |
| --- | --- |
| Ammonium nitrate | 61 |
| Iron | 34 |
| Vegetable starch | 2 |
| Long fibered asbestos | 3 |

The powdered material may be ground together to a substantially homogeneous mixture, and then these and the asbestos fibers shredded together until a mass of asbestos fibers covered with powdered material is obtained. The mixed fuel may then be pressed into cakes of a depth preferably not substantially exceeding one third their diameter. Pressures to 12,000 pounds per square inch may be used.

Further exemplary fuels may be compounded of the following:

| Component | Parts by Weight | |
| --- | --- | --- |
| | A | B |
| Ammonium Nitrate | 61 | 56 |
| Iron | 30 | 36 |
| Vegetable Starch | 3 | 2 |
| Long Fibered Asbestos | | 3 |
| Glass fiber | 3 | |
| Magnesium Oxide | 3 | |
| Sodium Nitrate | | 3 |

Referring to Figure 3, the device comprises a cylindrical can 30 of thin steel in the bottom of which is placed a pressed cake 31 of the volatile material to be dispersed, said material being surmounted by a thin sheet of metal foil such as 0.001 inch aluminum foil 32. Over said foil is placed a pressed fuel cake 33 of the general type hereinbefore described which on burning leaves behind a rigid, porous, clinker-type ash. A small pellet or ball 34 of a suitable starting composition is firmly adhered to or embedded in one portion of the periphery of the fuel cake 33. The upper surface of said fuel cake is covered with a second sheet of foil 35 upon which lies a second cake 36 of pressed volatile material. A flat-bottomed, thin, steel cup 37 is provided as a top closure for the device.

After the individual elements have been placed in the main container 30 in the proper order, the top closure 37 is placed in position on top of the second pressed cake 36 of volatile material. Sufficient external pressure is then delivered normal to the top closure to force the contents of the container 30 into close contact. The device may then be hermetically sealed by rolling the top edges of the cap 37 over the top edges of the can 30.

After the device has been sealed, a plurality of small holes 38 are cut through the walls of the can 30 at such a level as to expose the surface of the fuel cake 33. These holes serve as exit orifices for the volatilized matter and the gaseous combustion products of the fuel. Another hole 39 is cut so as to lie directly over the ball 34 of starting composition and expose the same. A suitable igniting means such as a red phosphorous match or a grenade fuse may be inserted through this hole to initiate combustion. To prevent the entrance of air through these holes, they are covered with a strip of adhesive tape 40 which may be torn off when the device is to be used.

This more simple device may be operated in essentially the same manner as the device shown in Figures 1 and 2. After the sealing tape has been removed, a suitable igniting means is inserted through hole 39 to initiate combustion of the starting composition which may be, for example, a mixture of potassium chlorate and sugar or a lightly packed ball of the fuel mixture used as the main body of fuel. As the starting material burns, it ignites the main body of fuel 33. Volatilizable material 31 and 36 coming in contact with the burning fuel is immediately flash boiled, and its vapors depart so rapidly and at such a velocity from the hot fuel cake surface, that no substantial decomposition of the vapors occurs. Both vapors and gaseous combustion products pass through the porous clinker and escape at velocities greater than the flame propagation velocity of the vapors through the exit orifices 38. In this embodiment of our invention, the clinker produced by burning the fuel 33 performs the double function of providing a hot surface suited to flash boiling and serving as a filter unit to prevent entrained droplets of volatilized material from escaping.

The features shown in the drawings are applicable to any large smoke pot design. It will be apparent, however, that there are other applications for our invention and many design modifications are possible without departing from its spirit and scope.

We desire that the specific details set forth in the foregoing examples be construed as illustrative and not by way of limitation and that only such limitations be imposed as are indicated in the appended claim.

The invention described herein may be manufactured and used by or for the Government of the United States of America for governmental purposes without the payment of any royalty thereon or therefor.

What is claimed is:

A smoke generator comprising a container having walls of smoke-impervious material, a series of three compressed, contiguous, overlying layers in said container of which the bottom layer is a smoke-producing composition, the intermediate layer is a fuel composition which on combustion yields a rigid porous ash, and the upper layer is a smoke-producing composition, a smoke-impervious plate within the container and overlying the entire area of the upper layer, said plate terminating in an upstanding perimetrical flange abutting the contiguous portions of the container wall, a tubular member depending from said plate and extending through the upper layer to the intermediate layer, whereby smoke produced in the upper layer is constrained to enter the intermediate layer for egress from the container, and means communicating with said tubular member at the top thereof for egress of smoke from the container.

BENJAMIN B. BLACKFORD.
CHARLES R. WALLACE.

REFERENCES CITED

The following references are of record in the file of this patent:

UNITED STATES PATENTS

| Number | Name | Date |
|---|---|---|
| Re. 16,841 | Bradner | Jan. 3, 1928 |
| 943,589 | Bent et al. | Dec. 14, 1909 |
| 1,336,557 | Benner et al. | Apr. 13, 1920 |
| 1,448,073 | Lucas et al. | Mar. 13, 1923 |
| 1,541,103 | Bradner | June 9, 1925 |
| 2,173,756 | Kronenberg | Sept. 19, 1939 |
| 2,333,637 | Carey | Nov. 9, 1943 |
| 2,396,710 | Levey et al. | Mar. 19, 1946 |

FOREIGN PATENTS

| Number | Country | Date |
|---|---|---|
| 4,580 | Great Britain | of 1904 |
| 8,642 | Great Britain | of 1915 |